(12) United States Patent
Ruppert et al.

(10) Patent No.: US 9,615,506 B2
(45) Date of Patent: Apr. 11, 2017

(54) SYSTEM FOR MONITORING AND CONTROLLING PRODUCT DISTRIBUTION IN AN AGRICULTURAL SYSTEM

(71) Applicant: CNH Industrial Canada, Ltd., Saskatoon (CA)

(72) Inventors: Rex L. Ruppert, Benson, MN (US); Bradley D. Hansen, Montevideo, MN (US); Martin J. Roberge, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 0 days.

(21) Appl. No.: 14/537,731

(22) Filed: Nov. 10, 2014

(65) Prior Publication Data
US 2016/0128270 A1     May 12, 2016

(51) Int. Cl.
*A01C 15/00* (2006.01)
*B05B 15/02* (2006.01)
(Continued)

(52) U.S. Cl.
CPC ........... *A01C 7/102* (2013.01); *A01C 7/081* (2013.01); *A01C 15/00* (2013.01); *A01C 15/04* (2013.01);
(Continued)

(58) Field of Classification Search
CPC ......... A01C 7/102; A01C 7/205; A01C 15/00; B05B 15/02; B05B 15/0208; B05B 15/0225; B05B 15/0258
(Continued)

(56) References Cited

U.S. PATENT DOCUMENTS

| 3,788,518 A | 1/1974 | Beebe | |
| 3,881,631 A * | 5/1975 | Loesch | A01C 7/044 111/180 |

(Continued)

FOREIGN PATENT DOCUMENTS

| EP | 1881244 A3 | 2/2008 |
| JP | 09135610 A | 5/1997 |
| WO | 2008155234 A2 | 12/2008 |

OTHER PUBLICATIONS

Agricultural Product Catalog, Dec. 31, 2012, pp. 38-39, DICKEY—john Corporation, Auburn, Illinois.

*Primary Examiner* — Arthur O Hall
*Assistant Examiner* — Joseph A Greenlund
(74) *Attorney, Agent, or Firm* — Rebecca L. Henkel; Rickard K. DeMille

(57) ABSTRACT

The present disclosure describes an agricultural system having a flow path configured to distribute agricultural product from a product storage tank to a row unit across a field via an air flow. The flow path includes an inlet configured to receive the agricultural product, an outlet configured to output the agricultural product, a body extending between the inlet and the outlet, and a first pressure tap and a second pressure tap each extending into the body. The agricultural system also includes a first pressure sensor fluidly coupled to the first pressure tap and configured to output a first signal indicative of a first static pressure of the air flow proximate to the first pressure tap, and a second pressure sensor fluidly coupled to the second pressure tap and configured to output a second signal indicative of a second static pressure of the air flow proximate to the second pressure tap. Further, the agricultural system includes a controller communicatively coupled to the first pressure sensor and the second pressure sensor and configured to receive the first signal and the second signal, and a supple- (Continued)

mental air supply fluidly coupled to the flow path proximate to the inlet and configured to selectively provide a supplemental air flow to the flow path. The controller is configured to instruct the supplemental air supply to selectively provide the supplemental air flow to the flow path based on the first signal, the second signal, or a combination thereof.

21 Claims, 5 Drawing Sheets

(51) Int. Cl.
  $A01C\ 15/04$ (2006.01)
  $A01C\ 7/10$ (2006.01)
  $A01M\ 9/00$ (2006.01)
  $A01C\ 7/08$ (2006.01)
(52) U.S. Cl.
  CPC ........... $A01M\ 9/0053$ (2013.01); $B05B\ 15/02$ (2013.01); $B05B\ 15/0208$ (2013.01); $B05B\ 15/0225$ (2013.01); $B05B\ 15/0258$ (2013.01)
(58) Field of Classification Search
  USPC ............... 239/68, 566, 69, 76, 101, 67, 112
  See application file for complete search history.

(56) References Cited

U.S. PATENT DOCUMENTS

| | | | |
|---|---|---|---|
| 3,891,120 A | 6/1975 | Loesch et al. | |
| 4,112,777 A * | 9/1978 | Knepler | A01C 7/044 73/714 |
| 4,354,775 A | 10/1982 | Jalas | |
| 4,612,964 A | 9/1986 | Durant | |
| 4,629,164 A * | 12/1986 | Sommerville | A01M 7/0092 222/23 |
| 4,917,304 A * | 4/1990 | Mazzei | F17D 3/12 239/304 |
| 5,024,035 A * | 6/1991 | Hanson | E04B 2/18 52/309.12 |
| 5,787,825 A | 8/1998 | Yaji et al. | |
| 5,924,371 A * | 7/1999 | Flamme | A01B 79/005 111/177 |
| 6,024,035 A * | 2/2000 | Flamme | A01B 79/005 111/178 |
| 6,176,647 B1 * | 1/2001 | Itoh | B05B 5/1683 406/14 |
| 6,308,646 B1 | 10/2001 | Luxon | |
| 6,546,811 B2 * | 4/2003 | Fincke | G01F 1/44 73/861.63 |
| 6,644,225 B2 | 11/2003 | Keaton | |
| 7,806,061 B2 | 10/2010 | Memory | |
| 8,001,914 B2 | 8/2011 | Peterson et al. | |
| 8,350,689 B2 | 1/2013 | Mariman et al. | |
| 8,746,158 B2 * | 6/2014 | Binsirawanich | G01F 1/74 111/174 |
| 9,043,950 B2 * | 6/2015 | Wendte | A01C 7/042 |
| 2002/0002425 A1 * | 1/2002 | Dossey | G01F 1/44 700/284 |
| 2011/0035163 A1 * | 2/2011 | Landphair | A01C 7/081 702/45 |
| 2012/0186504 A1 * | 7/2012 | Ryder | A01B 79/005 111/174 |
| 2012/0228395 A1 * | 9/2012 | Needham | F16K 31/0606 239/11 |
| 2013/0061790 A1 * | 3/2013 | Binsirawanich | A01C 7/081 111/174 |
| 2013/0085598 A1 * | 4/2013 | Kowalchuk | A01C 7/102 700/231 |
| 2013/0320106 A1 * | 12/2013 | Schmidt | A01G 25/16 239/1 |
| 2014/0049395 A1 * | 2/2014 | Hui | A01C 7/081 340/608 |
| 2014/0263409 A1 * | 9/2014 | Wagers | B65G 53/40 222/1 |
| 2015/0366127 A1 * | 12/2015 | Roberge | A01M 7/00 239/8 |
| 2015/0375247 A1 * | 12/2015 | Funseth | B05B 12/04 239/68 |
| 2016/0000004 A1 * | 1/2016 | Ni | B05B 12/008 239/74 |
| 2016/0088791 A1 * | 3/2016 | Horsch | A01C 7/16 111/149 |

* cited by examiner

SYSTEM FOR MONITORING AND CONTROLLING PRODUCT DISTRIBUTION IN AN AGRICULTURAL SYSTEM

BACKGROUND

The present disclosure generally relates to monitoring and controlling product distribution in agricultural systems.

Generally, certain agricultural implements and vehicles (e.g., seeders, floaters, and planters) are configured to distribute product (e.g., seeds, fertilizer, and pesticides) across a field. The agricultural implement/vehicle may improve crop yield and/or farming efficiency by increasing an amount of product distributed and/or a speed at which the product is distributed across the field. Accordingly, the agricultural implement may improve crop yield and/or farming efficiency by operating at, or near, maximum capacity.

However, traditional agricultural implement/vehicle distribution systems, or components thereof (e.g., booms), may become clogged with product during operation, especially when operating at or near maximum capacity. Clogs reduce crop yield and/or farming efficiency by decreasing an amount of product distributed and/or speed at which the product is distributed across the field. Accordingly, operators of traditional agricultural implements/vehicles often (a) operate at or near maximum capacity, which may result in increased product clogs (resulting in reduced yields/efficiency), or (b) operate substantially below maximum capacity to reduce a likelihood of developing product clogs, which results in reduced yield and/or efficiency.

BRIEF DESCRIPTION

Certain embodiments commensurate in scope with the present disclosure are summarized below. These embodiments are not intended to limit the scope of the disclosure, but rather these embodiments are intended only to provide a brief summary of possible forms of the disclosure. Indeed, the disclosure may encompass a variety of forms that may be similar to or different from the embodiments set forth below.

In a first embodiment, an agricultural system includes a flow path configured to distribute agricultural product from a product storage tank to a row unit across a field via an air flow. The flow path includes an inlet configured to receive the agricultural product, an outlet configured to output the agricultural product, a body extending between the inlet and the outlet, and a first pressure tap and a second pressure tap each extending into the body. The agricultural system also includes a first pressure sensor fluidly coupled to the first pressure tap and configured to output a first signal indicative of a first static pressure of the air flow proximate to the first pressure tap, and a second pressure sensor fluidly coupled to the second pressure tap and configured to output a second signal indicative of a second static pressure of the air flow proximate to the second pressure tap. Further, the agricultural system includes a controller communicatively coupled to the first pressure sensor and the second pressure sensor and configured to receive the first signal and the second signal, and a supplemental air supply fluidly coupled to the flow path proximate to the inlet and configured to selectively provide a supplemental air flow to the flow path. The controller is configured to instruct the supplemental air supply to selectively provide the supplemental air flow to the flow path based on the first signal, the second signal, or a combination thereof.

In a second embodiment, an agricultural system includes a product distribution system. The product distribution system includes flow paths configured to distribute agricultural product from a product storage tank to row units via air flows. Each flow path includes an inlet configured to receive the agricultural product, an outlet configured to output the agricultural product, a body extending between the inlet and the outlet, and a first pressure tap and a second pressure tap each extending into the body. The product distribution system also includes an air blower configured to provide the air flows to the flow paths for distributing the agricultural product. The agricultural system also includes a control system configured to control the product distribution system. The control system includes first pressure sensors fluidly coupled to the first pressure taps and configured to output first signals indicative of first static pressures of the air flows proximate to the first pressure taps, and second pressure sensors fluidly coupled to the second pressure taps and configured to output second signals indicative of second static pressures of the air flows proximate to the second pressure taps. The control system also includes a controller communicatively coupled to the first pressure sensors and the second pressure sensors and configured to receive the first signals and the second signals. Further, the control system includes a supplemental air supply fluidly coupled to the flow paths proximate to the inlets and configured to selectively provide supplemental air flows to one or more flow path of the flow paths. The controller is configured to instruct the supplemental air supply to selectively provide the supplemental air flows to the one or more flow paths based on the first signals, the second signals, or a combination thereof.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
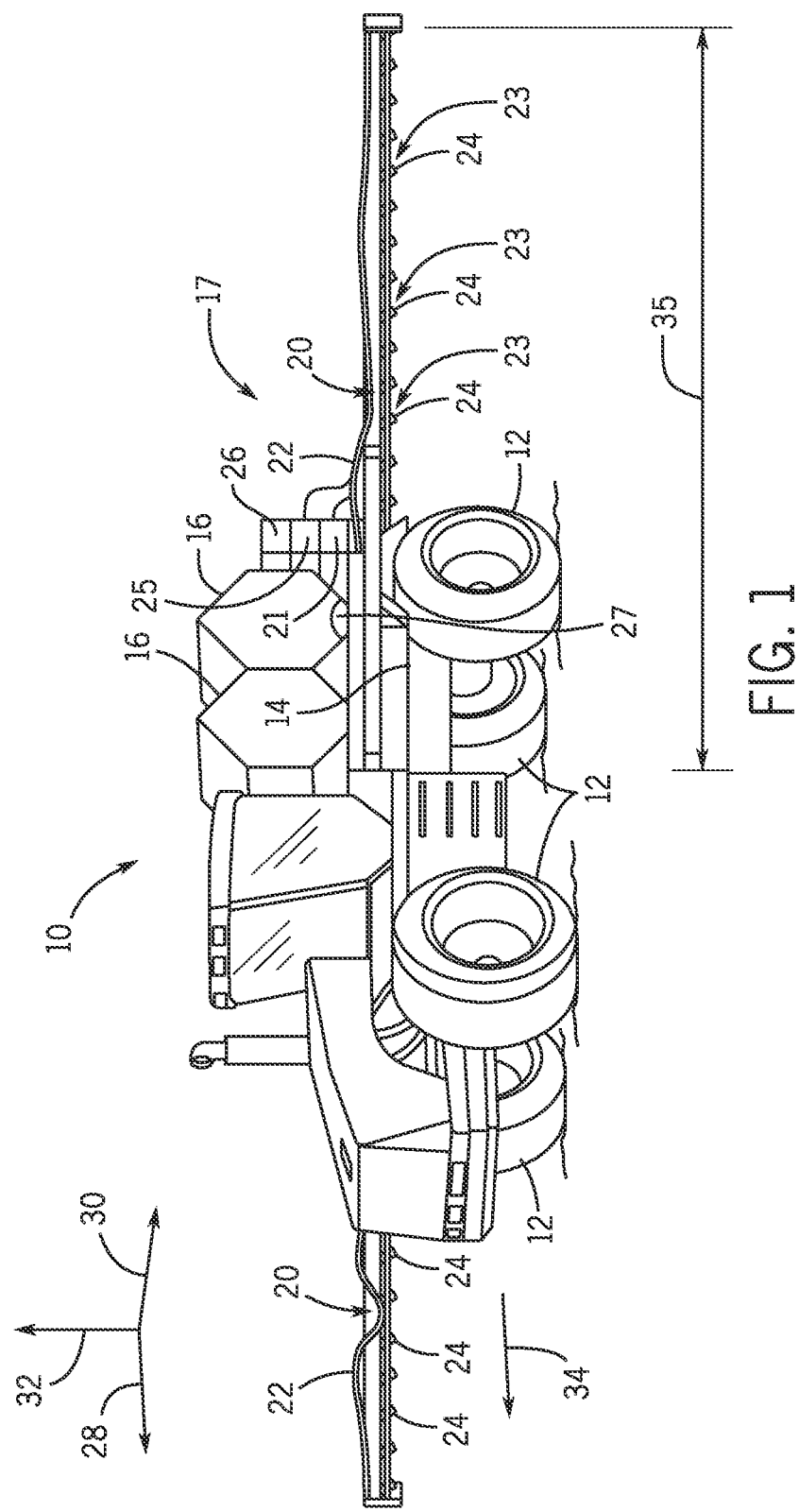
FIG. 1 is a side perspective view of an embodiment of an agricultural implement having a control system configured to at least partially control a product distribution system of the agricultural implement.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Embodiments disclosed herein relate generally to systems for monitoring and controlling product distribution in agricultural implements. In particular, the present disclosure relates to a system for maintaining a desirable rate of product distribution through conduits of the agricultural implement. For example, the agricultural implement may be an agricultural applicator having one or more storage containers for storing agricultural product (e.g., seeds, fertilizer, and/or pesticides). The agricultural implement may include an air-driven metering and distribution system (or product distribution system, for short) configured to meter and distribute product to applicators that apply the product to a field. The agricultural applicators may include respective nozzles (e.g., outlets) and are positioned on booms (e.g., arms) that extend laterally outwardly from the agricultural applicator. The agricultural product is routed through the conduits attached to the booms via an air flow generated by, for example, a fan or compressor of the product distribution system.

Disclosed embodiments are directed particularly to a control system configured to monitor and control a rate of product distribution through the conduits, in which the rate of product distribution through the conduits may depend on inputs (e.g., pressure or velocity measurements) to the control system. For example, the control system may communicate with the product distribution system to control the product distribution system. In particular, the control system may communicate with a supplemental air supply of the product distribution system, in which the supplemental air supply is configured to provide a supplemental air flow to one or more of the conduits (e.g., flow paths) to unclog the flow path and/or to reduce a likelihood of product clogs forming in the flow path. Indeed, the control system may include pressure measurement devices, or some other measurement devices, configured to determine static pressures, velocities, or flow rates proximate to various locations of the conduits/flow paths to determine if a product clog is present and/or likely to form. Accordingly, based on, for example, the pressure measurements, the control system may automatically activate the supplemental air supply (or, in some embodiments, the control system may automatically determine a desired operating capacity of the agricultural implement, as described below). In certain embodiments, the control system may include a display configured to provide an operator with real-time or near real-time information relating to the rate of product distribution, a susceptibility of the product distribution system to a product clog, and overall performance of the agricultural implement, such that the operator may manually activate the supplemental air supply and/or determine the desired operating capacity of the agricultural implement.

It should be noted that the desired operating capacity may be based on a calculation performed by the control system, may be determined by the operator, or may be determined based on other or a combination of considerations. Indeed, in some embodiments, the desired operating capacity may vary based on the operator's preference. For example, the control system may take into account historical data relating to operating capacity and susceptibility of product clogs and, based on the historical data, determine and automatically set the desired operating capacity. Additionally or alternatively, the operator may determine the desired operating capacity based on information shown on the display or other considerations. In general, the control system is configured to improve efficiency and performance of the agricultural implement in accordance with the description above, and will be described in detail below with reference to the figures.

With the foregoing in mind, FIG. 1 is a side perspective view of an embodiment of an agricultural applicator granular fertilizer implement 10 (e.g., applicator) configured to meter and distribute product (e.g., fertilizer) as the applicator 10 travels through a field. The illustrated applicator 10 is self-propelled and includes wheels 12 (e.g., floatation wheels) configured to travel over the field while distributing the weight of the applicator 10 over a large area. The applicator 10 includes a chassis assembly 14 (e.g., frame) configured to support one or more product storage containers 16 (e.g., storage volumes, bins, or tanks). The storage containers 16 may be part of a product distribution system 17 of the applicator 10. In some embodiments, the product storage containers 16 may be divided into multiple compartments. The product storage containers 16 are configured to hold (e.g., support or store) various solid particulate agricultural products, such as fertilizers, herbicides, pesticides, nutrients, or other biologically-active agents, for example. In some cases, the product storage containers 16 may store advanced granules.

In the illustrated embodiment, the product distribution system 17 of the applicator 10 has two elongated arms or booms 20 mounted on the chassis assembly 14, in which the booms 20 are configured to support conduits/flow paths 22 that receive product from the product storage containers 16. In other embodiments, the product distribution system 17 may have fewer or more booms 20. In embodiments in accordance with the present disclosure, the product distribution system 17 includes an air blower 21 configured to blow air through the flow paths 22 of the booms to convey the product from the product storage containers 16 through the flow paths 22. In particular, the air flow routed through the flow paths 22 via the air blower 21 is configured to convey the product through the flow paths 22 to applicator devices 23 at outlets 24 of the flow paths 22. The applicator devices 23, for example, may each include a nozzle configured to output the product.

In addition to the air blower 21, the product distribution system 17 of the applicator 10, in accordance with present embodiments, also includes a supplemental air supply 25. The supplemental air supply 25 is configured to be selectively operated to provide supplemental air flows through the flow paths 22 of the booms 20. Supplemental air flows provided by the supplemental air supply 25 are configured to break up product clogs within the flow paths 22. The supplemental air supply 25 may provide a sustained supplemental air flow, or the supplemental air supply 25 may provide a pulsed supplemental air flow. Indeed, the term "supplemental air flow" used herein may refer to a number of different types of supplemental air flows, including a short boost or flow, a long boost or flow, a series of pulsed or pulsated boosts or flows, a series of random boosts flows, or a combination thereof.

In general, the supplemental air supply 25 is actuated by a control system 26 of the applicator 10 (or an operator thereof), and the control system 26, or an operator thereof, may instruct the supplemental air supply 25 when to provide the supplemental air flow and what type of supplemental air flow to provide. The control system 26 is configured to receive signals indicative of pressures (or air flow velocities) from sensors located in various areas of the flow paths 22. Determined pressures and/or velocities may indicate that a product clog in one or more of the flow paths 22 is present, imminent, or likely to form. For example, each of the flow paths 22 may include a constant cross-sectional area with respect to the directions the air flow through the flow path 22. If product builds up within the flow path 22, the cross-sectional area of the flow path 22 is reduced proximate to the buildup. Accordingly, a static pressure proximate to the reduced cross-sectional area decreases (e.g., with respect to the static pressure upstream from the reduced cross-sectional area) as the air flow velocity correspondingly increases. The increase in velocity (and, thus, dynamic pressure) and the corresponding decrease in static pressure is commonly referred to as a Venturi effect, and the pressure/velocity can be readily determined from Bernoulli's principle. By taking pressure measurements (e.g., static pressure measurements) at various locations in each flow path 22 of the booms 20, a pressure drop can be determined between two of the various locations (e.g., an upstream location and a downstream location), which indicates the presence or likelihood of formation of a product at the downstream location. It should be noted, however, that velocities, instead of pressures, may be determined at similar locations to the pressures, and compared in a similar manner to determine the presence or likelihood of formation of a product clog. For example, an increase in velocity between the upstream location and the downstream location in the flow path 22 may indicate that a product clog is occurring, or is likely to occur, at the downstream location.

In the illustrated embodiment, the control system 26 may be manually or automatically operated to instruct the supplemental air supply 25 to provide supplemental air flows. The control system 26, based on the pressure determinations (as described above), may also automatically determine a desired operating capacity of the applicator 10 and instruct a metering device 27 (integral or separate from the product storage tanks 16) to provide product to the flow paths 22 (e.g., conduits) at a desired rate. Additionally or alternatively, the control system 26, based on the determined pressures (or velocities), may instruct the air blower 21 to operate at a desired capacity for providing air flow to the flow path 22. For example, air flow could be based on (e.g., correspond with) product flow rate. The control system 26, the product distribution system 17, and the applicator 10 are described in detail below with reference to later figures.

For purposes of discussion, the applicator 10 may be described with reference to an axial axis or direction 28, a lateral axis or direction 30, and a vertical axis or direction 32. Further, the applicator 10 may move in a forward direction 34 across the field. In a working position, the booms 20 extend generally laterally outward (e.g., along the lateral axis 30) from the chassis assembly 14 and may be generally parallel to a surface of the field to facilitate distribution of the solids to the field. In a transport or storage position, the booms 20 may be folded against the chassis assembly 14 such that they extend generally in the axial direction 28. Each of the booms 20 may have any suitable length 35 for distributing the solids across a large surface area as the applicator 10 travels across the field. For example, each of the booms 20 may be approximately 10, 15, 20, 25, 30, or more meters (m) or more. In some embodiments, each of the booms may be between approximately 10 m to 30 m, or 15 m to 25 m.

Although the applicator 10 of FIG. 1 is a self-propelled applicator 10, it should be understood that the applicator 10 may be a towed applicator implement that is supported by wheels and coupled to a tow vehicle (e.g., a harvester, a tractor, or the like). Additionally, the disclosed embodiments for metering and distributing solids may be adapted for use with other types of agricultural implements and/or other types of applicators.

Figure 2:
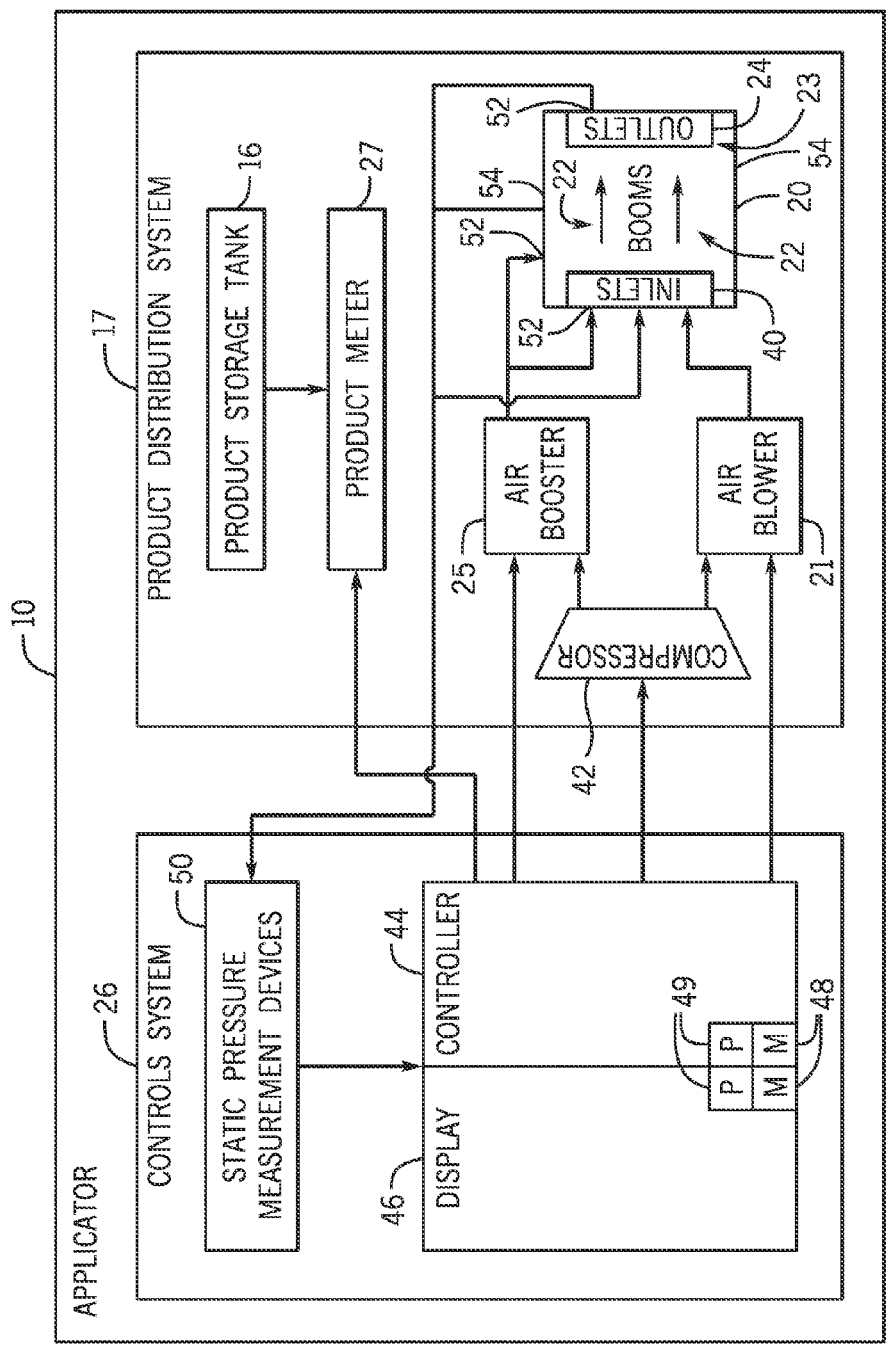
FIG. 2 is a schematic diagram of the agricultural implement of FIG. 1 having the control system and the product distribution system.

Turning now to FIG. 2, a schematic diagram of an embodiment of the applicator 10 having the control system 26 configured to at least partially control and/or monitor the product distribution system 17 is shown. In the illustrated embodiment, the product distribution system 17 includes the product storage tank 16 configured to store granular product (e.g., fertilizer), the product meter 27 configured to meter the product (e.g., control a rate at which product is distributed to inlets 40 of the flow paths 22), and a compressor 42 configured to compress air and to provide air to the supplemental air supply 25 (where the air blower 21 is a standalone unit and does not need the compressor 42). The product distribution system 17 also includes the booms 20 having the flow paths 22, which are configured to route product from the product storage tank 16 along the booms 20 (e.g., through the flow paths 22) to the outlets 24 via an air flow from the air blower 21. It should be noted that inlet 40, in the present disclosure, may refer to an inlet area or region that includes inlets for the receiving the product from the product storage tank 16 separate from inlets for receiving air from the air blower 21. Alternatively, the product may be entrained in the air flow from the air blower 21 before entering the flow paths 22.

The control system 26 in the illustrated embodiment includes a controller 44 and a display 46, and the controller 44 and/or the display 46 include separate (or, in some embodiments, shared) memory 48. The memory 48 is configured to store executable instructions which, when executed by the controller 44 (or a processor 49), perform various functions related to control and/or monitoring of the product distribution system 17.

The control system 26 also includes one or more pressure sensors 50 (e.g., pressure gauges, venturi meters, or other pressure measurement devices) or velocity sensors configured to measure a static pressure (or velocity) of air or fluid within the one or more flow path 22 (e.g., conduits) of the booms 20. For simplicity of discussion, pressure measurement devices and in particular pressure sensors, will be described in detail herein, although it should be noted that velocity measurement devices (e.g., velocity sensors), or a different type of pressure measurement device, may be utilized in the same or a similar manner, as previously described. For example, the pressure sensors 50 are each coupled to respective pressure taps 52 extending into the flow paths 22. The pressure taps 52 are oriented perpendicular to the flow of air through the flow paths 22 (e.g., perpendicular to walls defining the flow paths 22 and, thus, perpendicular to the air flow through the flow paths 22), such that static pressure of the air or fluid can be measured via the static pressure measurement devices or sensors 50. Further, the pressure taps 52 may be located at various locations along the flow path 22. For example, in one embodiment, a first pressure tap 52 is located proximate to the inlet 40 of one flow path 22, and a second pressure tap 52 is located proximate to the outlet 24 of the same flow path 22. Accordingly, a first pressure sensor 50 determines the static pressure at the first pressure tap 52 proximate to the inlet 40 and a second pressure sensor 50 determines the static pressure at the second pressure tap 52 proximate to the outlet 24. Signals indicative of the two determined pressures are sent from the sensors 50 to the controller 44 and received by the controller 44 which, upon execution of instructions stored in the memory 48, compares the two pressures and determines if a clog is present in the flow path 22, or if a clog is likely to form. Alternatively or additionally, as previously described, the controller 44 may be configured to receive and compare signals indicative of determined velocities from various locations in each flow path 22.

After determining a status of the flow path 22 (e.g., whether a product clog is present, imminent, or likely to form), the controller 44 may, based on the executable instructions stored in the memory 48, instruct the supplemental air supply 25 to provide a supplemental air flow to the flow path 22. As previously described, the supplemental air flow may be a long supplemental air flow, a short supplemental air flow, a pulsed or pulsated supplemental air flow, or some other type of supplemental air flow. The particular supplemental air flow selected by the controller 44 may be determined based on whether the product clog has already occurred or the likelihood of the product clog occurring in the future. Additionally, the particular supplemental air flow selected by the controller 44 may be selected based on a magnitude of the product clog in the flow path 22. For example, based on the signals (e.g., indicative of the pressures) provided to the controller 44 by the static pressure sensors 50, the controller 44 may determine a percentage (e.g., within a range) of the cross-sectional area of the flow path 22 that is clogged. The controller 44 may then determine which type of supplemental air flow to instruct of the supplemental air supply 25 to provide based at least in part on the percentage of clog, the location of the clog, or a combination thereof.

Alternatively, the controller 44 may compare the determined pressures as described above and, instead of directly instructing the supplemental air supply 25 to provide supplemental air flow(s), the controller 44 may provide information via a signal to the display 46 of the control system 26. The display 46 is generally viewable and accessible by an operator of the applicator 10, such that the operator may, depending on the embodiment, directly operate the supplemental air supply 25 via the display 46 (e.g., a touch screen display) or a user interface proximate to the display 46. Further, in some embodiments, the controller 44 may automatically instruct the supplemental air supply 25, and may also provide information to the display 46. In certain embodiments, the supplemental air supply 25 may automatically operate via instructions from the controller 44, and the operator of the applicator 10 may manually override or supplement the automatic control of the supplemental air supply 25.

It should be noted that, in addition to pressure taps 52 and corresponding pressure sensors 50 located at or proximate to the inlets 40 and outlets 24 of the flow paths 22, pressure taps 52 and corresponding pressure sensors 50, in some embodiments, are distributed along the flow path(s) 22 at various other locations. Accordingly, fluid pressure may be determined at particular locations along the flow path 22 and provided to the controller 44. For example, a single flow path 22 may include 2, 3, 4, 5, 6, 7, 8, 9, or 10 or more pressure taps 52 and corresponding pressure gauges 50. Based on signals indicative of the pressures from the multiple sensors 50, the controller 44 may identify a location or potential range of locations within the flow path 22 where a product clog has formed or is likely to form. Information related to the location of the product clog may enable the controller 44 to determine an appropriate type of supplemental air flow to instruct the supplemental air supply 25 to provide. Further, each of the booms 20 (e.g., arms) may include multiple flow paths 22, in which the flow paths 22 each distribute product. For example, a first flow path 22 of one boom 20 distributes product proximate to the chassis assembly 14 of the applicator 10 via an outlet 24 of a first applicator device 23. A second flow path 22 of the same boom 20 distributes product to another outlet 24 of a second applicator device 23 positioned laterally outwardly from the first applicator device 23, relative to the chassis assembly 14. A third flow path 22 of the same boom 20 distributes product a distance outwardly from the second flow path 22, relative to the chassis assembly 14, through a third outlet 24 of a third applicator device 23, and so on, and so forth. The distribution of the applicator devices 23 along the booms 20 (e.g., at the outlets 24 of the flow paths 22) enables the applicator 10 to distribute product over a large area as the applicator 10 moves across the field. Each of the flow paths 22 includes pressure taps 52, as previously described, and respective pressure sensors 50 (e.g., pressure sensors) fluidly coupled to each of the pressure taps 52. Accordingly, product clogs may be detected or preempted in each of the flow paths 22. Further, each of the flow paths 22 may include a separate supplemental air supply 25, or a single supplemental air supply 25 may be coupled to each of the flow paths 22 and may be configured to pivot supplemental air flows to a particular flow path 22 based on identification of a product clog (or susceptibility to a product clog) in the particular flow path 22, as determined by the controller 44 (or an operator thereof). Accordingly, the controller 44 (or an operator) may instruct the supplemental air supply 25 (or one of the multiple supplemental air supplies 25) to provide a supplemental air flow to the clogged (or potentially soon to be clogged) flow path 22 of, for example, one of the two booms 20.

It should also be noted that, in some embodiments, the controller 44, based on pressure signals provided by the static pressure sensors 50 (or based on velocity signals provided by velocity sensors 50), may instruct the product distribution system 17 to operate at a determined operating capacity. For example, the controller 44 may, in some embodiments, instruct the product meter 27 to meter product at a particular rate. Additionally, the controller 44 may, in some embodiments, instruct the air blower 21 to provide the air flow to the flow paths 22 of the booms 20 at a particular rate. Thus, the controller 44 may determine an operating capacity that substantially reduces the possibility of product clogs forming in the flow paths 22. Alternatively, the controller 44 may output signals to the display 46, such that the display 46 presents information to an operator of the applicator 10 that enables the operator to determine a desired operating capacity (e.g., an operating capacity that substantially reduces the possibility of clog formation) and to manually operate the product distribution system 17 accordingly. Additionally or alternatively, the display 46, in some embodiments, shows the operator a desired operating capacity as determined by the control system 26, such that the operator can accept the desired operating capacity determined by the control system 26 or override the desired operating capacity determined by the control system 26 by manually selecting the operating capacity. Further, if the capacity of the product distribution system 17 (e.g., application system) is lowered, a slower vehicle speed may be desired, such that the overall application rate (e.g., pounds per acre) does not change. The controller 44 may send signals/information to the vehicle 10 (e.g., applicator) to change its ground speed, or notify the operator.

Figure 3:
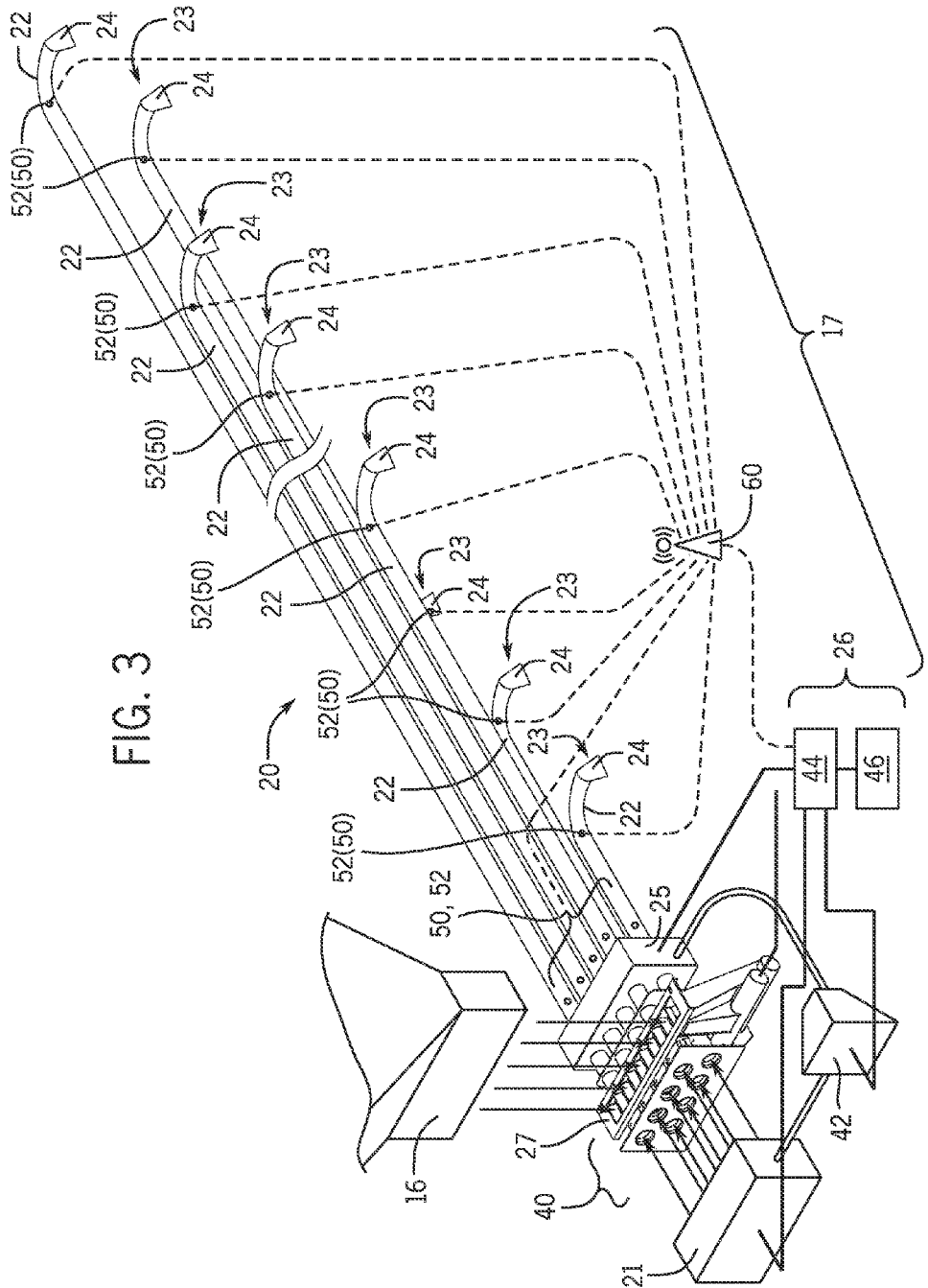
FIG. 3 is a perspective view of an embodiment of a control system and a product distribution system that may be used on the agricultural implement of FIG. 1.

Turning now to FIG. 3, a perspective view of an embodiment of the control system 26 and the product distribution system 17 is shown. As illustrated, one boom 20 of the applicator 10 includes multiple flow paths 22 (e.g., conduits or piping). As previously described, the flow paths 22 include respective applicator devices 23 at outlets 24 of the flow paths 22. The applicator devices 23, for example, may include nozzles configured to output the product, and the applicator devices 23 are disposed progressively farther from the applicator 10 with each successive flow path 22. Accordingly, the product (e.g., fertilizer) is distributed in rows (e.g., row units) over a larger area of the field.

In the illustrated embodiment, the air blower 21 provides fluid flow (e.g., air flow) to each of the flow paths 22 of the illustrated boom 20, where the air blower 21 may be coupled to, or a part of, the compressor 42, as previously described. In certain embodiments, the air blower 21 may not include a compressor and may be a standalone unit. Also coupled to the compressor 42, in the illustrated embodiment, is the supplemental air supply 25 which is configured to, upon instruction from the controller 44 of the control system 26 (e.g., via signals provided by the controller 44), provide one or more supplemental air flows to one or more of the flow paths 22 (e.g., pipes or tubes) of the boom 20. In the illustrated embodiment, each of the flow paths 22 includes one pressure tap 52 proximate to the inlet 40 of the flow path and one pressure tap proximate to the outlet 24 of the flow path. It should be noted that, as previously described, the inlet 40 of each flow path 22 may refer to an inlet area or region of the flow path 22 (e.g., conduit or pipe) configured to receive a flow of air and product (e.g., from the product storage tank 16). For example, the inlet 40 may include an inlet configured to receive the product (e.g., from the product storage tank) and in inlet configured to receive the air flow (e.g., from the air blower 21). Thus, for example, each of the flow paths 22 may include an opening for receiving air or fluid from the air blower 21 and a separate opening for receiving product from the product storage tank 16, where two openings may be collectively referred to the inlet 40. Alternatively, in other embodiments, the product may be entrained in the air flow at some point upstream of the flow paths 22.

Each of the flow paths 22, as previously described, includes at least two pressure taps 52 and corresponding static pressure sensors 50 (e.g., proximate to the inlet 40 and proximate to the outlet 24). However, multiple other pressure taps 52 and corresponding sensors 50 may be disposed along each flow path 22 (e.g., between the inlet 40 and the outlet 24). The pressure sensors 50 may be embedded or inserted into the pressure taps 52. The pressure sensors 50 are configured to output signals indicative of static pressure (or, alternatively, velocity) proximate to the inlet 40 of each flow path 22 and/or proximate to the outlet 24 of each flow path 22. The pressure sensors 50 output the signals to the controller 44 of the control system 26 for processing. The signals may be transmitted via wiring along an inside or outside of each of the flow paths 22 to the controller 44 or, in some embodiments, the pressure sensors 50 and the controller 44 may be communicatively coupled to an Internet system 60 (or some other network) and the signals may be communicated over the Internet system 60. In either configuration, the controller 44 receives the static pressure signals (or velocity signals, as previously described) and determines, based on the static pressure signals (or velocity signals), which, if any, flow paths 22 include product clogs or are likely to develop product clogs in the future. For example, as previously described, if the static pressure proximate to the outlet 24 of one flow path 22 is substantially lower than the static pressure measured proximate to the inlet 40 (or is otherwise substantially lower than would be expected proximate to the outlet 24) of the flow path 22, a product clog may be present, imminent, or likely to form. The static pressure drop, as previously described, is consistent with Bernoulli's principle, and indicates that the cross-sectional area of the flow path 22 is reduced with respect to the direction of the air flow. In other words, a substantial decrease in static pressure across the flow path (e.g., a pressure drop or static pressure drop), from the inlet 40 to the outlet 24, generally indicates an increase in dynamic pressure, which also indicates an increase in flow speed that is consistent with a decreased cross-sectional area or a product build up (and, thus, is consistent with Bernoulli's principle, the principle of continuity, the Venturi effect, the principle of conservation of mechanical energy, etc.). To dislodge the product clog, the controller 44 may instruct the supplemental air supply 25 to provide a supplemental air flow to the appropriate flow path in accordance with the description below.

It should be noted that detection of partial product clogs may depend on a number of factors. For example, a partial product clog not near one of the pressure sensors 50 may be difficult to detect if flow at least partially recovers downstream of the partial product clog. For example, a partial product clog may be more readily detected by a pressure sensor 50 immediately downstream the partial product clog. Of course, a partial product clog is likely to generate a higher than expected head loss in the flow path 22 that includes the partial product clog. Thus, it may be possible, depending on the extent or magnitude of the partial product clog, to detect the partial product clog via a sensor 50 that is not immediately adjacent to and downstream the partial product clog. However, in general, including an increased number of sensors 50 (e.g., located an increased number of locations along the flow path 22) may enable faster and more accurate detection of partial product clogs or product clogs that are likely to occur, as one of the sensors 50 is likely to be located closer to the partial product clog than if a reduced number of sensors 50 is included.

In the illustrated embodiment in FIG. 3, one supplemental air supply 25 is fluidly coupled to each of the flow paths 22. The supplemental air supply 25 includes multiple valves in fluid communication with a common air source, and each valve is fluidly coupled a respective flow path 22. Upon instruction from the controller 44, each of the valves (or one or more of the valves) may be selectively opened or closed to enable fluid to flow from the supplemental air supply 25 to one or more of the flow paths 22. Via the valved configuration described above, the supplemental air supply 25, upon instruction from the controller 44, selectively enables or disables fluid communication between the supplemental air supply 25 and selected flow paths 22 of the boom 20. Put differently, the controller 44 may instruct the supplemental air supply 25 to, for example, leave only one valve open and close the remaining valves. Accordingly, air provided to the supplemental air supply 25 from the compressor 42 (or some other source) may be directed to only one flow path 22 as a supplemental air flow. The compressor 42 may provide air to the supplemental air supply 25 at a desired pressure or at a desired flow rate, for a desired duration, in pulses, or in some other manner, as instructed by the controller 44. Alternatively or additionally, the supplemental air supply 25 may be instructed by the controller 44 to open and/or close valves in a certain manner depending on the desired type of supplemental air flow. For example, the controller 44 may instruct the supplemental air supply 25 to rapidly open and close one valve, while leaving the other valves closed, for a desired duration. Accordingly, pulsated supplemental air flows may be provided to the clogged or partially clogged flow path 22 for the desired amount of time.

Figure 4:
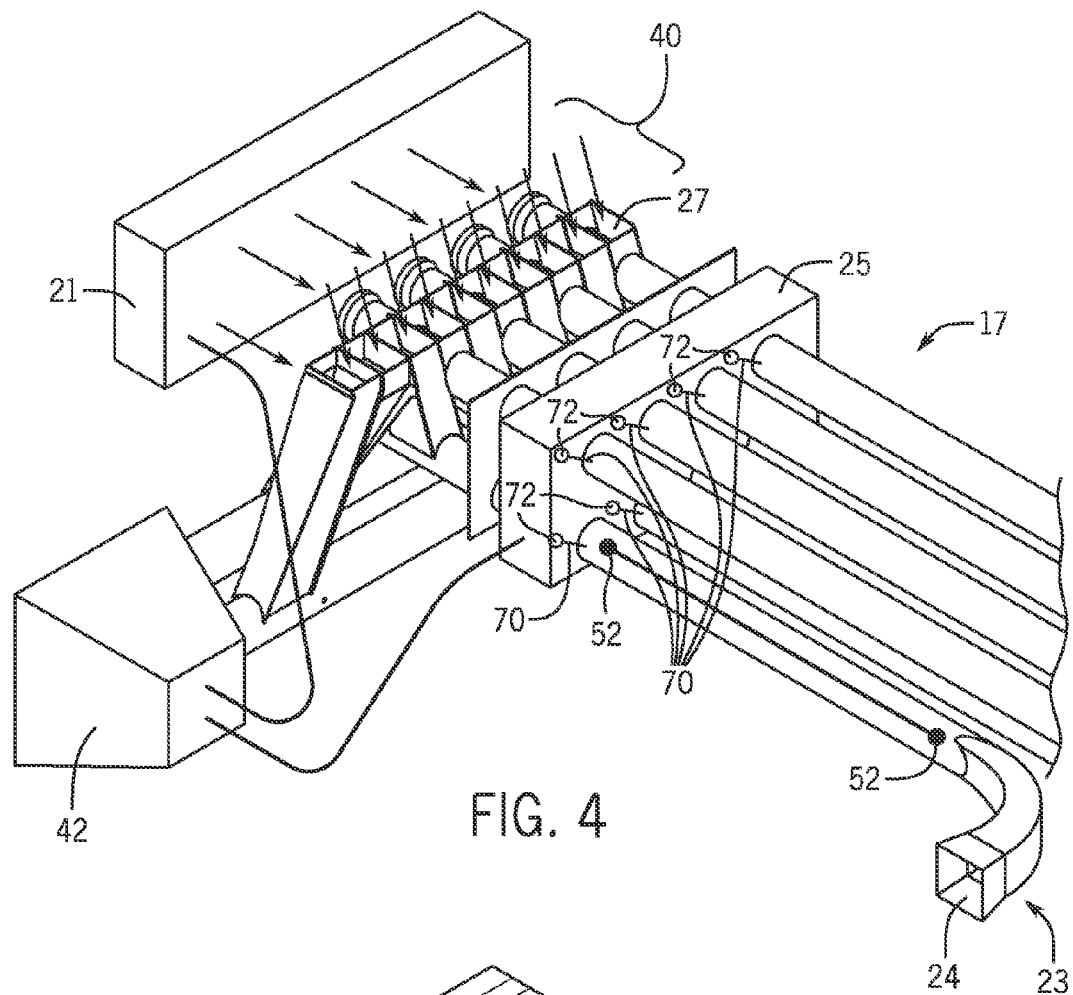
FIG. 4 is a perspective view of a portion of the control system and the product distribution system of FIG. 3.

A perspective view of a portion of the product distribution system 17 of FIG. 3 is shown in FIG. 4. For simplicity, the control system 26 (in particular, the controller 44) is not illustrated but will be referenced with respect to the product distribution system 17 in the discussion below. In the illustrated embodiment, as previously described, the compressor 42 supplies air to the supplemental air supply 25 and/or the air blower 21. In another embodiment, the air blower 21 may be coupled to a different compressor or may be a standalone unit. In either embodiment, the air blower 21 is configured to provide fluid (e.g., air) to the inlets 40 of the flow paths 22 for conveying product through the flow paths 22. The product (e.g., fertilizer), in the illustrated embodiment, drops (e.g., via gravity) through the metering device 27 and into a separate opening (or, in another embodiment, the same opening) of the inlets 40 from above the boom 20. The metering device 27 may provide resistance to product flow from the product storage tank 16 to the flow paths 22. The resistance may be selectively increased or decreased, upon instruction from the controller 44, for example, such that product is metered at a desired rate. In some embodiments, the metering device 27 may be a Venturi box. The controller 44, or an operator via the display 46 (e.g., user interface), may determine a desired operating capacity (e.g., rate of product distribution) of the applicator 10, and adjust the metering device 27 accordingly.

In the illustrated embodiment, the compressor 42 is coupled to the supplemental air supply 25, and the supplemental air supply 25 is fluidly coupled to each of the flow paths 22 to provide supplemental air flows to the flow paths 22. For example, the illustrated supplemental air supply 25 includes a number of nozzles 70, each nozzle 70 being fluidly coupled to a respective one of the flow paths 22. The nozzles 70 may be housed within the supplemental air supply 25 (e.g., the illustrated supply box 25), or the nozzles 70 may be disposed proximate to the sensors 52. In the illustrated embodiment, each of the nozzles 70 includes a valve 72 configured to be selectively opened or closed, as instructed by the controller 44, as previously described. For example, one of the valves 72 may be transitioned to an open position while all the remaining valves 72 are left in a closed position (as, for example, per instructions from the controller 44). Accordingly, upon instruction from the controller 44, the supplemental air supply 25 may provide a supplemental air flow to the flow path 22 having the open valve 72.

Figure 5:
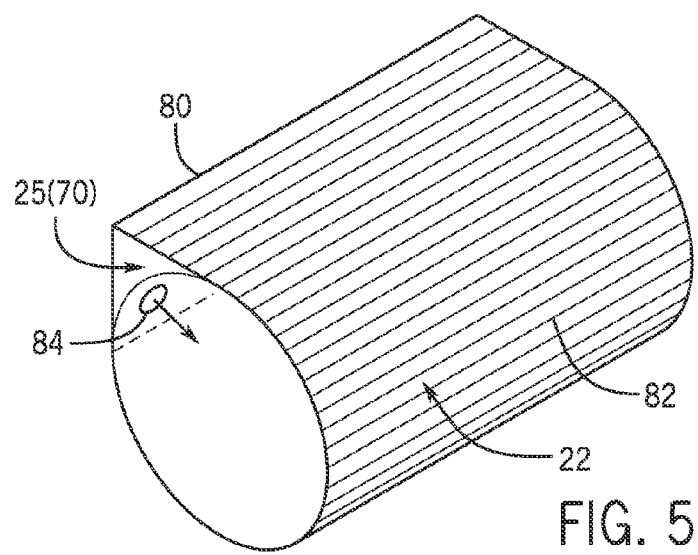
FIG. 5 is a perspective view of an embodiment of a conduit that may be used in the product distribution system of FIG. 3.

It should be noted that, in some embodiments, the supplemental air supply 25 may provide the supplemental air flows to the flow path 22 via an air duct integrated with the flow path. For example, a portion of an embodiment of a flow path 22 having an integrated duct 80 is shown in FIG. 5. In the illustrated embodiment, the duct 80 is disposed onto a cylindrical surface 82 of the flow path 22. The duct 80 is configured to receive the supplemental air flow from the supplemental air supply 25 (or from the nozzle 70 thereof).

Because the duct 80 is not configured to distribute product (e.g., the duct 80 is substantially void of product), the supplemental air flow travels through the duct 80 substantially uninterrupted by product or product clogs.

An opening 84 fluidly couples the duct 80 to the flow path 22, in which the flow path 22 is configured to distribute the product. The duct 80 may also include one or more flow diverting features configured to divert the supplemental air flow through the opening between the duct 80 and the flow path 22. For example, a supplemental air flow may be provided to the duct 80 via the supplemental air supply 25 and routed through the opening 84 by the flow diverting features, such that the supplemental air flow enters the flow path 22 proximate to the product clog and breaks up the product clog to unclog the flow path 22. It should be noted that the duct 80 may include any number of openings 84 (with corresponding flow diverting features) between the duct 80 and the flow path 22 such that clogs at various locations may be removed, as described above. The flow diverting features may be selectively movable (e.g., based on instruction from the controller 44). Accordingly, if a product clog is located proximate to a particular one of the openings 84, the controller 44 may move the appropriate flow diverting feature(s) for diverting the supplemental air flow from the duct 80, through the desired opening 84, and to the product clog. Alternatively or additionally, one or more of the openings 84 between the duct 80 and the flow path 22 may be selectively closed, e.g., via instructions from the controller 44 to direct the supplemental air flow to a region of the flow path 22 just upstream of, and proximate to, a detected product clog. The controller 44, or an operator via the display 46 or user interface of the control system 26, may instruct (e.g., control) the flow diverting features, the openings 84, and/or the supplemental air supply 21 to direct the supplemental air flow to the region upstream of and proximate to the clog, based on the determined pressure(s) and/or velocity/velocities at one or more location along the flow path(s) 22.

Figure 6:
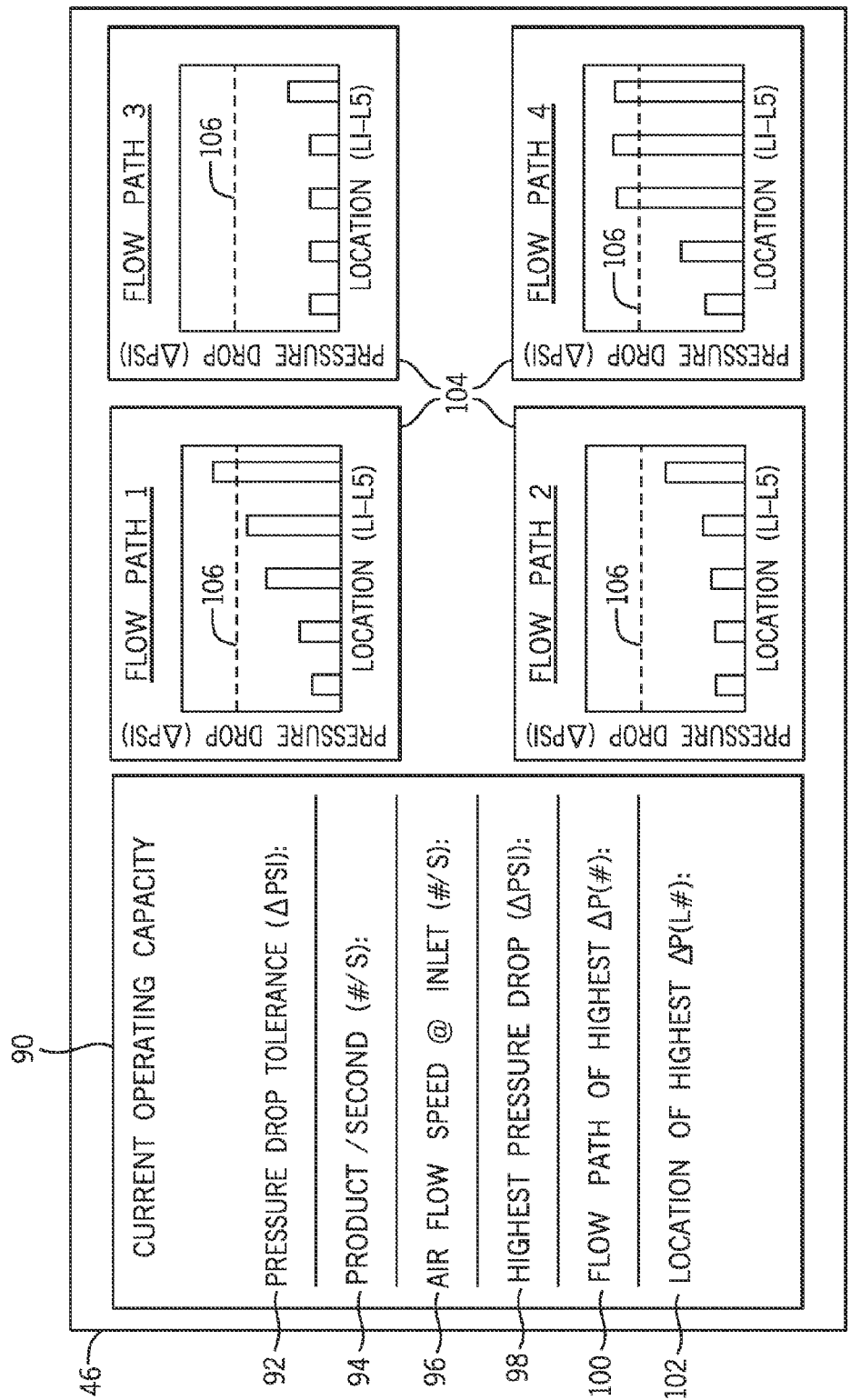
FIG. 6 is a schematic diagram of an embodiment of a display that may be used in the control system of the agricultural implement of FIG. 1.

Turning now to FIG. 6, an embodiment of the display 46 configured to display information relating to the product distribution system 17 (and the applicator 10 in general) is shown. As previously described, the display 46 may be configured to display a wide range of information for viewing by an operator. The display 46 may show information relating to, for example, static pressures in each flow path 22, a comparison between static pressures in a single flow path 22 and/or between flow paths 22, current operating capacity, suggested operating capacity, a target operating capacity, a determined pressure drop (e.g., within each flow path 22), a pressure drop tolerance, a location of one or more particular pressure drops within each flow path 22 (e.g., conduit), and/or other information. It should be noted that operating capacity may refer to an amount of product being distributed per unit of time or some other metric directed to performance of the product distribution system 17. It should also be noted that air velocity within the flow paths 22 may also be determined and displayed on the display 46. In addition, air velocity may be determined and, based on the velocities, pressure information may be determined and displayed on the display 46. Or, pressures may be determined and, based on the pressures, velocity information may be displayed on the display 46. One of ordinary skill in the art would recognize that, in light of Bernoulli's principle (among other mathematical derivations relating pressures and velocities of a moving fluid), either pressures or velocities of the air flow within the flow paths 22 may be determined, compared, and utilized to determine whether a product clog has formed, or may form, in one or more flow paths 22 of the booms 20.

In the illustrated embodiment, the display 46 includes an operating capacity section 90 configured to provide the operator with information relating to the operating capacity of the applicator 10 and, more particularly, the product distribution system 17 of the applicator 10. For example, the illustrated operating capacity section 90 includes a pressure drop tolerance segment 92 configured to indicate a pressure drop threshold for each flow path 22 of the booms 20. For example, the pressure drop tolerance may be automatically determined and set by the controller 44, or manually set by the operator. If the pressure drop within one of the flow paths 22 exceeds the pressure drop tolerance (e.g., at a particular location with the flow path 22), the operator (or the controller 44) may instruct the supplemental air supply to provide a supplemental air flow (e.g., upstream and proximate to the clog or partial clog). The illustrated current operating capacity section 90 also includes a product output section 94 which indicates how much product is being distributed (e.g., per unit time). For example, the product output section 94 may indicate that a certain number of seeds or fertilizer particles is being distributed per second. The product output section 94 in the illustrated embodiment is an aggregate number that includes totals from all of the flow paths 22, although individual product output information may be shown for each separate flow path 22 in another embodiment. The illustrated current operating capacity section 90 also includes an air flow speed segment 96 configured to show a speed of the air provided by the air blower 21. In particular, the air flow speed segment 96 may show the air flow speed at the inlets 40 of the flow paths 22. In some embodiments, segment 96 may be a flow rate segment, which indicates a volumetric flow rate of the air flow (e.g., cubic meters per hour (m$^3$/hr) or cubic feet per minute (cfm)). In some embodiments, the display 46 may include an air flow rate and an air flow speed segment.

In addition, the current operating capacity section 90 includes information relating to product clogs in the flow paths 22. For example, the current operating capacity section 90 includes a highest pressure drop segment 98 that indicates the highest pressure drop across all locations of all flow paths 22, a flow path at highest pressure drop segment 100 that indicates which flow path 22 has the highest pressure drop, and a location segment 102 that indicates the location of the highest pressure drop within the flow path 22 having the highest pressure drop (e.g., in segment 100). The segments 98, 100, 102 may indicate to the operator the area with the largest clog or having the most likelihood of forming a clog. In addition, if supplemental air flows from the supplemental air supply 25 are unsuccessful in unclogging the flow path(s) 22, the segments 98, 100, 102 readily alert the operator such that the operator may take the applicator 10 off-line for maintenance. The segments 98, 100, 102 may also direct the operator to the areas of the booms 20 (or flow paths 22 thereof) at which the clog may be located or likely to form. Further, the control system 26 shown in previous embodiments may include a purge mode that, when activated, clears all the booms 20 (e.g., the flow paths 22 thereof) of substantially all the product. For example, the purge mode may be activated before taking the product distribution system 17 off-line for a substantial amount of time (e.g., at the end of the work day). The operator may utilize the display 46 features to determine if the purge mode successfully cleared the booms 20 (e.g., the flow paths 22 thereof) of the product.

Further still, in the illustrated embodiment, the display 46 presents graphs for showing the pressure drop in particular flow paths 22, and at particular locations in each flow path 22. For example, pressure drop graphs 104 are shown on the display 46 in the illustrated embodiment, in which each of the pressure drop graphs 104 shows pressure drops along the respective flow path 22 at various locations relative to, e.g., the inlet 40 (e.g., locations L1 through L5). Each of the graphs 104 includes a pressure drop tolerance line 106 which indicates whether the determined pressure drop exceeds or is approaching the pressure drop tolerance at the various locations in each flow path 22. Indeed, the pressure drop tolerance line 106 in the graphs 104 corresponds with the pressure drop tolerance segment 92 in the current operating capacity section 90. The pressure drop tolerance may be automatically determined, adjusted, and/or suggested by the controller 44, as previously described, or the pressure drop tolerance may be determined and adjusted by the operator based at least in part on the information displayed on the display 46. Further, in some embodiments, the display 46 may include information relating to the ground speed of the vehicle 10 described in previous embodiments. The current ground speed may be shown on the display 46 and/or a historical ground speed may be tracked over time and shown on the display 46 via a graph.

In general, the disclosed control system 26 is configured to enhance performance, efficiency, and output of the applicator 10, and in particular the performance, efficiency, and output of the product distribution system 17 of the applicator 10. By monitoring pressure and/or velocity of air flow within the flow paths 22 of the booms 20 of the applicator 10, by identifying product clogs within each flow path 22 based on the pressure and/or velocity, and by removing the clogs by providing supplemental air flows via the supplemental air supply 25, an operating capacity of the applicator 10 (and in particular the product distribution system 17) may be increased and/or more accurately determined compared to embodiments without the disclosed control system 26. Further, the applicator 10 may be operated for a longer period of time without maintenance because product clogs may be more readily identified and removed, in accordance with the present disclosure.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural system, comprising:
  a flow path configured to guide agricultural product through the flow path via a primary air flow, wherein the flow path comprises an inlet configured to receive the agricultural product, an outlet configured to output the agricultural product, a body extending between the inlet and the outlet, and a first pressure tap and a second pressure tap each extending into the body;
  an air blower configured to provide the primary air flow to the flow path to urge the agricultural product through the flow path;
  a first pressure sensor fluidly coupled to the first pressure tap and configured to output a first signal indicative of a first static pressure of the primary air flow proximate to the first pressure tap;
  a second pressure sensor fluidly coupled to the second pressure tap and configured to output a second signal indicative of a second static pressure of the primary air flow proximate to the second pressure tap;

a controller communicatively coupled to the first pressure sensor and the second pressure sensor, and configured to receive the first signal and the second signal; and a supplemental air supply separate from the air blower, fluidly coupled to the flow path, and configured to selectively provide a supplemental air flow to the flow path, wherein the controller is configured to instruct the supplemental air supply to selectively provide the supplemental air flow to the flow path based on the first signal, the second signal, or a combination thereof.

2. The agricultural system of claim 1, comprising a control system having the controller, wherein the control system comprises a display communicatively coupled to the controller and configured to display primary information indicative of the first static pressure, the second static pressure, a comparison between the first and second static pressures, or a combination thereof, wherein the display is viewable by an operator.

3. The agricultural system of claim 2, wherein the display is configured to display supplemental information indicative of a current operating capacity of the agricultural system, a suggested operating capacity of the agricultural system, a target operating capacity of the agricultural system, or a combination thereof.

4. The agricultural system of claim 1, wherein the controller is configured to determine a pressure drop between the second static pressure and the first static pressure and to instruct the supplemental air supply to selectively provide the supplemental air flow to the flow path while the pressure drop exceeds a pressure drop tolerance.

5. The agricultural system of claim 1, wherein the supplemental air supply separate from the air blower comprises an air booster.

6. The agricultural system of claim 1, comprising a product storage tank configured to store the agricultural product and a metering device configured to meter the agricultural product at a rate to the inlet of the flow path, wherein the controller is communicatively coupled to the metering device, and wherein the controller is configured to control the rate.

7. The agricultural system of claim 1, wherein the agricultural product comprises seed, fertilizer, pesticide, or a combination thereof.

8. The agricultural system of claim 1, wherein the supplemental air supply is configured to provide the supplemental air flow as a short duration supplemental air flow, a long duration supplemental air flow, a series of pulsated supplemental air flows, a patterned series of supplemental air flows, a series of random duration supplemental air flows, or a combination thereof.

9. The agricultural system of claim 1, wherein the flow path comprises a primary flow path and a supplemental flow path at least partially separated from the primary flow path by a wall, wherein the primary flow path is configured to receive the agricultural product and the primary air flow, wherein the supplemental flow path is configured to receive the supplemental air flow, and wherein an opening through the wall fluidly couples the primary flow path with the supplemental flow path to enable the supplemental air flow to travel through the supplemental flow path, through the opening, and into the primary flow path.

10. An agricultural system, comprising:

a flow path configured to distribute agricultural product through the flow path via a primary air flow provided by a primary air supply, wherein the flow path comprises an inlet configured to receive the agricultural product, an outlet configured to output the agricultural product, a body extending between the inlet and the outlet, and a first pressure tap and a second pressure tap each extending into the body;

a first pressure sensor fluidly coupled to the first pressure tap and configured to output a first signal indicative of a first static pressure of the primary air flow proximate to the first pressure tap;

a second pressure sensor fluidly coupled to the second pressure tap and configured to output a second signal indicative of a second static pressure of the primary air flow proximate to the second pressure tap;

a controller communicatively coupled to the first pressure sensor and the second pressure sensor, and configured to receive the first signal and the second signal;

a duct immediately adjacent to the flow path, wherein a wall at least partially separates the duct from the flow path, and wherein at least one opening through the wall fluidly couples the flow path with the duct; and a supplemental air supply fluidly coupled to the duct and configured to selectively provide a supplemental air flow to the duct to enable the supplemental air flow to travel through the duct, through the opening, and into the flow path, wherein the supplemental air supply is separate from the primary air supply, and wherein the controller is configured to instruct the supplemental air supply to selectively provide the supplemental air flow to the duct based on the first signal, the second signal, or a combination thereof.

11. The agricultural system of claim 10, wherein the at least one opening comprises a plurality of openings extending through the wall, wherein the plurality of openings fluidly couples the duct and the flow path.

12. The agricultural system of claim 11, comprising a plurality of flow diverters, each flow diverter corresponding to an associated opening of the plurality of openings, wherein each flow diverter is configured to selectively enable and disable flow through the associated opening, and wherein the controller is configured to selectively control the plurality of flow diverters based on the first signal, the second signal, or the combination thereof.

13. The agricultural system of claim 10, wherein the controller is configured to determine, based at least in part on the first signal, the second signal, or the combination thereof, a location of a clog, or a pre-clog condition, of the agricultural product within the flow path.

14. The agricultural system of claim 10, wherein the wall comprises a cylindrical wall defining a circular cross-section of the flow path.

15. The agricultural system of claim 10, wherein the primary air supply comprises an air blower configured to provide the primary air flow to the flow path.

16. An agricultural system, comprising:

a flow path configured to distribute agricultural product from a product storage tank through the flow path via a primary air flow provided by a primary air supply, wherein the flow path comprises an inlet configured to receive the agricultural product, an outlet configured to output the agricultural product, a body extending between the inlet and the outlet, and a first pressure tap and a second pressure tap each extending into the body;

a first pressure sensor fluidly coupled to the first pressure tap and configured to output a first signal indicative of a first static pressure of the primary air flow proximate to the first pressure tap;

a second pressure sensor fluidly coupled to the second pressure tap and configured to output a second signal indicative of a second static pressure of the primary air flow proximate to the second pressure tap;

a controller communicatively coupled to the first pressure sensor and the second pressure sensor and configured to receive the first signal and the second signal; and a supplemental air supply separate from the primary air supply, fluidly coupled to the flow path, and configured to selectively provide a supplemental air flow to the flow path, wherein the controller is configured to instruct the supplemental air supply to selectively provide the supplemental air flow to the flow path in accordance with a supplemental air flow pattern of a plurality of supplemental air flow patterns, and wherein the controller is configured to select the supplemental air flow pattern from the plurality of supplemental air flow based at least in part on the first signal, the second signal, or a combination thereof.

17. The agricultural system of claim 16, wherein the plurality of supplemental air flow patterns comprises a first pattern having pulsated air boosts.

18. The agricultural system of claim 16, wherein the plurality of supplemental air flow patterns comprises a second pattern having a series of random air boosts.

19. The agricultural system of claim 16, wherein the plurality of supplemental air flow patterns comprises a third pattern having a short duration air boost.

20. The agricultural system of claim 16, wherein the flow path comprises a primary flow path and a supplemental flow path at least partially separated from the primary flow path by a wall, wherein the primary flow path is configured to receive the agricultural product and the primary air flow, wherein the supplemental flow path is configured to receive the supplemental air flow, and wherein an opening through the wall fluidly couples the primary flow path with the supplemental flow path to enable the supplemental air flow to travel through the supplemental flow path, through the opening, and into the primary flow path.

21. The agricultural system of claim 16, wherein the primary air supply comprises an air blower configured to provide the primary air flow to the flow path to urge the agricultural product through the flow path, wherein the air blower is separate from the supplemental air supply.

* * * * *